No. 814,393. PATENTED MAR. 6, 1906.
J. C. PERRY.
MACHINE FOR MAKING INTERPOSED FABRIC.
APPLICATION FILED AUG. 27, 1904.
8 SHEETS—SHEET 6.
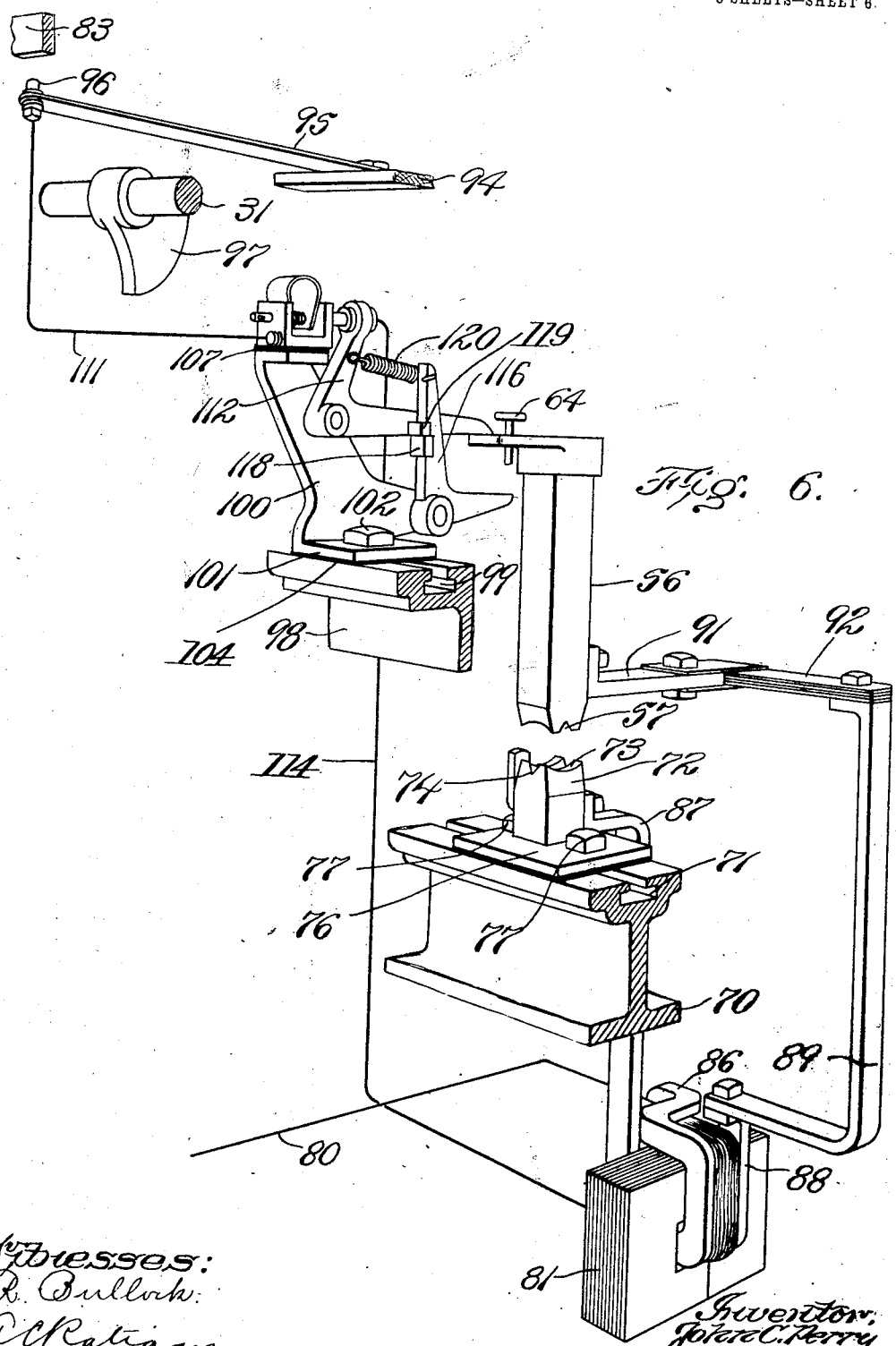

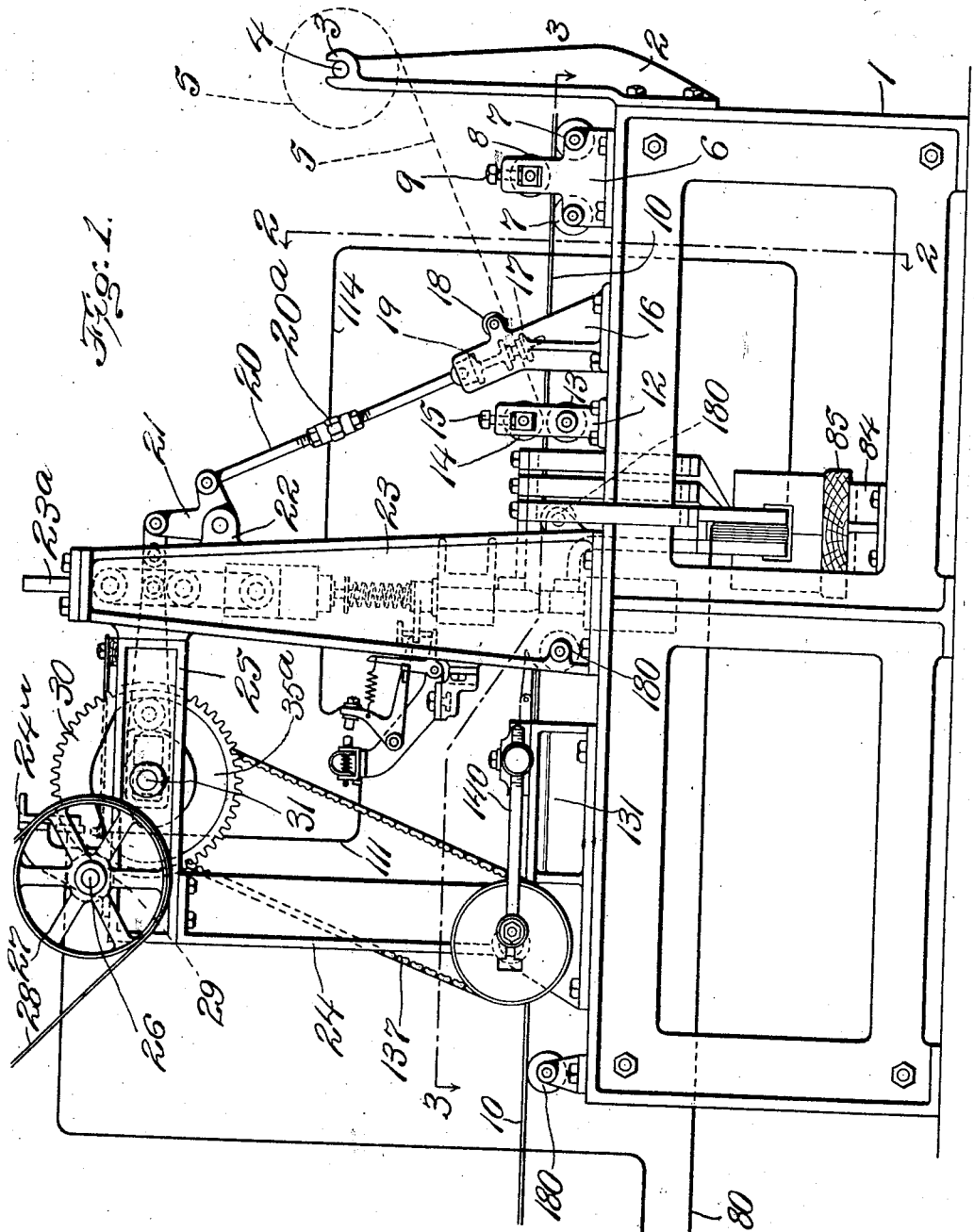

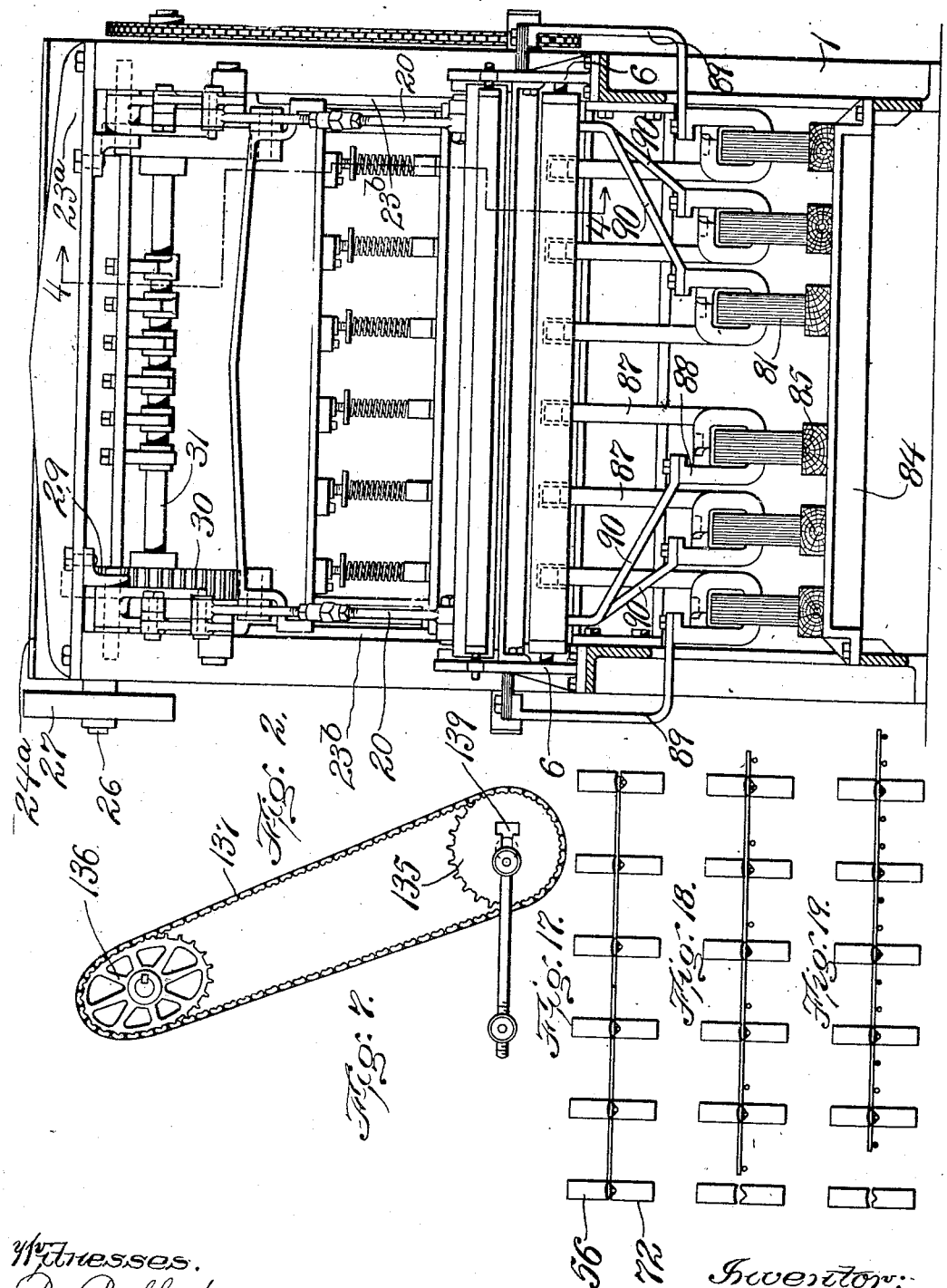

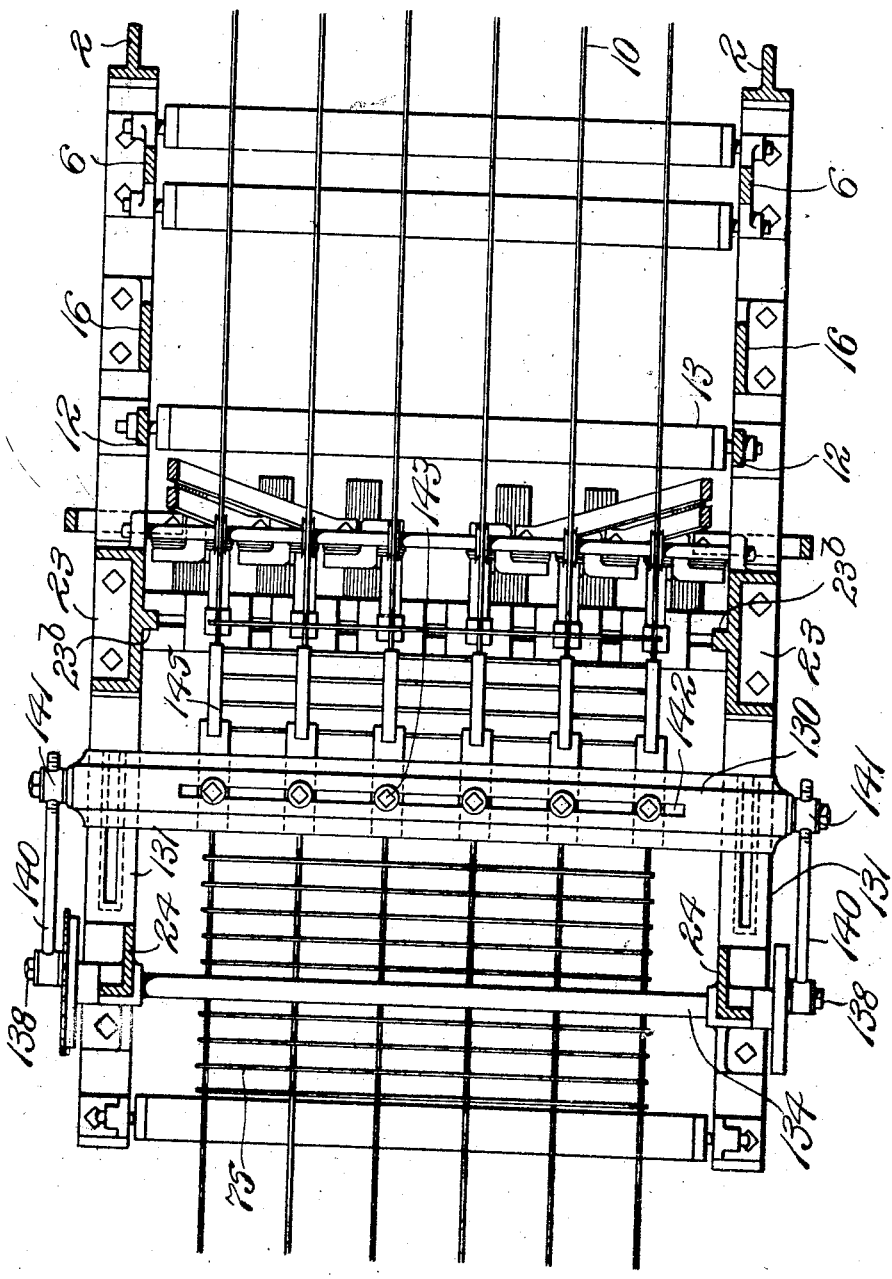

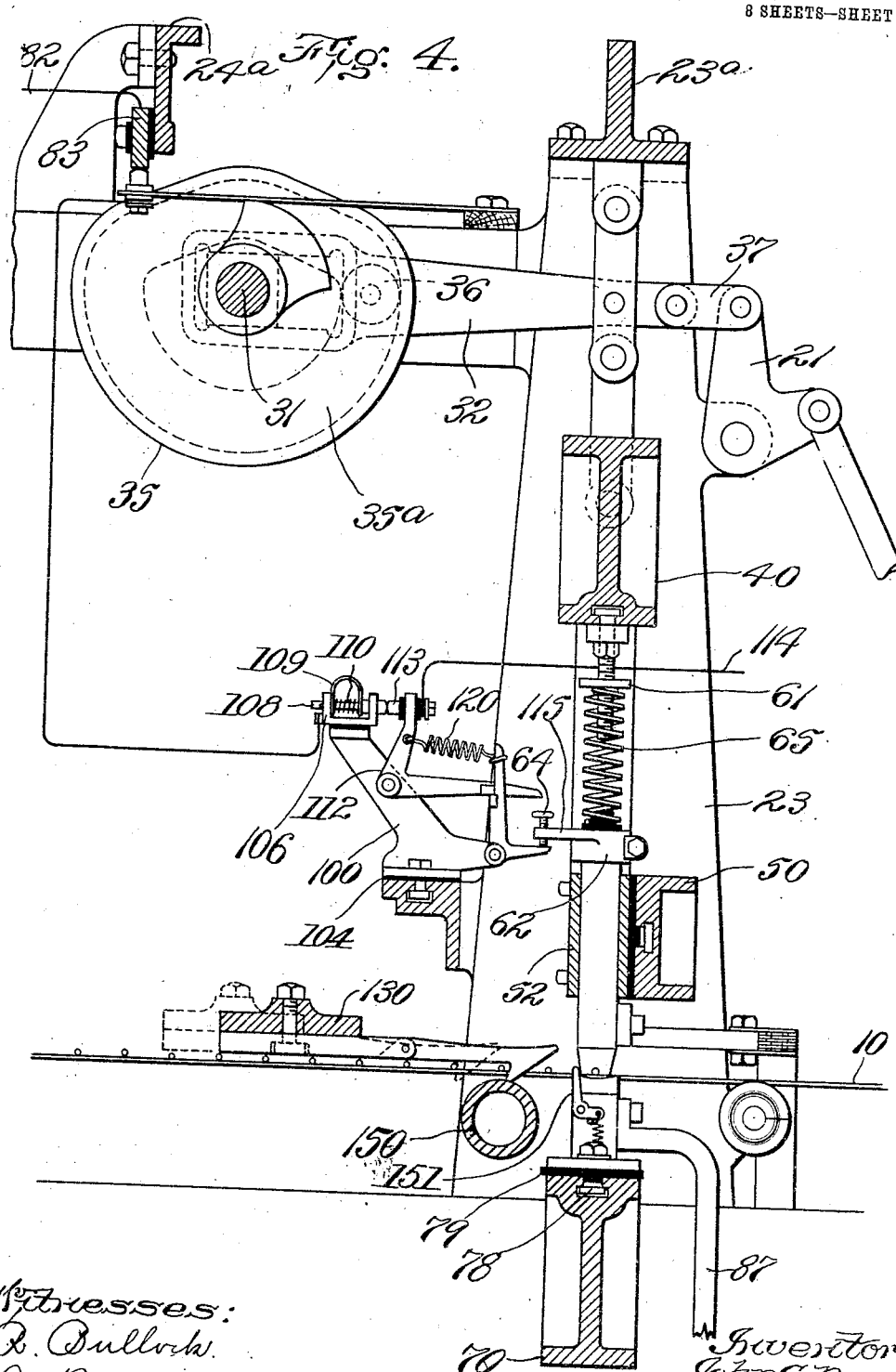

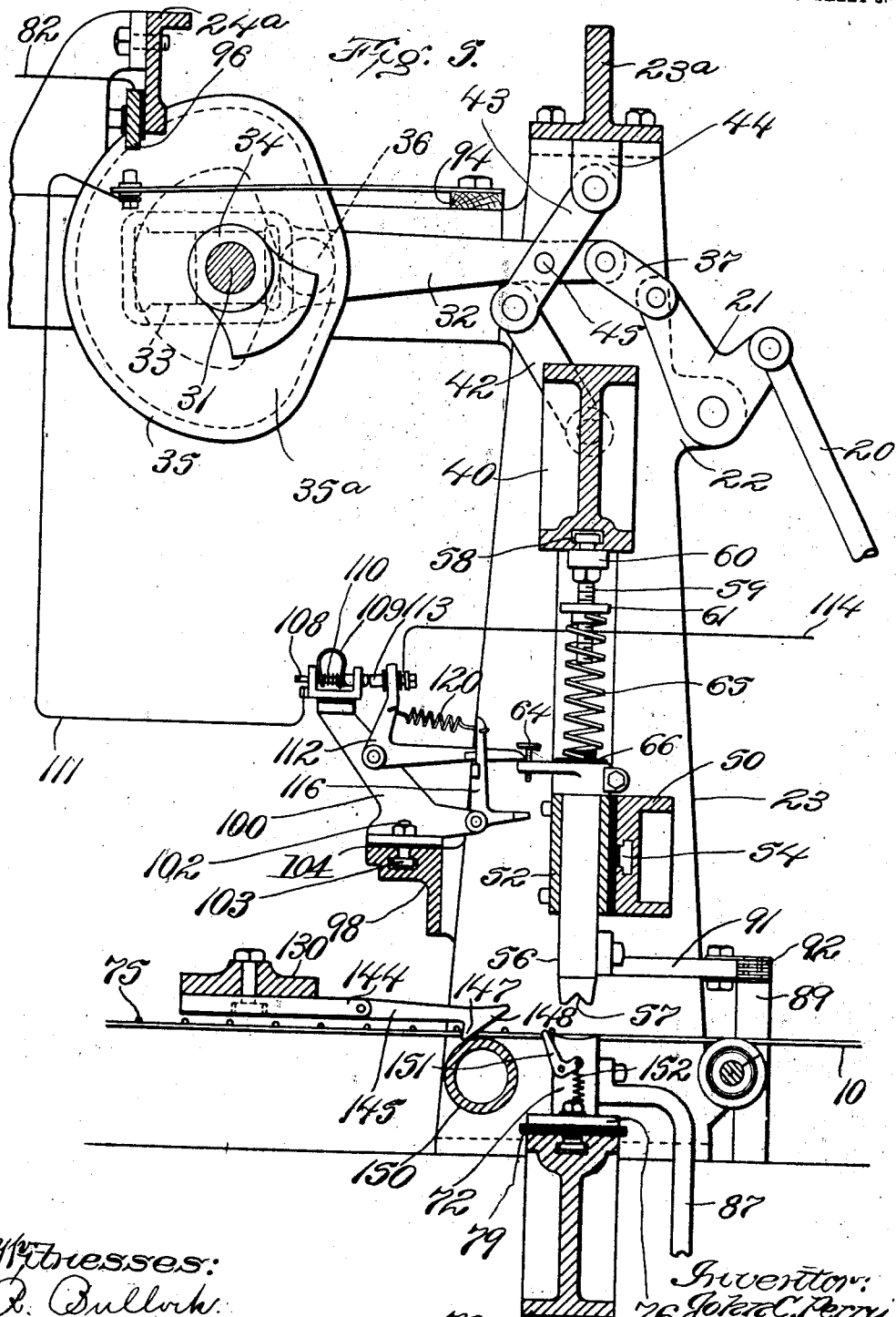

No. 814,393. PATENTED MAR. 6, 1906.
J. C. PERRY.
MACHINE FOR MAKING INTERPOSED FABRIC.
APPLICATION FILED AUG. 27, 1904.
8 SHEETS—SHEET 7.
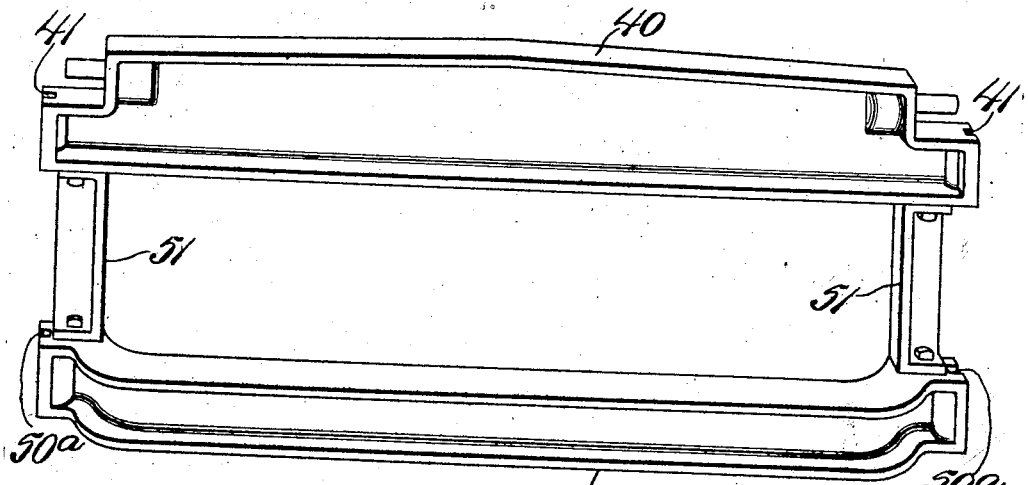
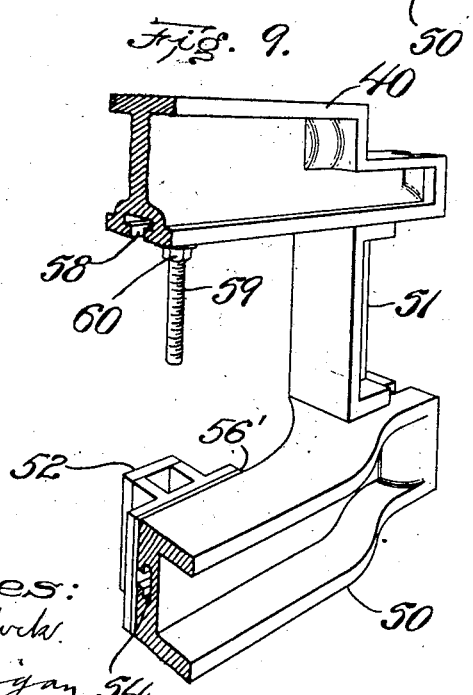

No. 814,393. PATENTED MAR. 6, 1906.
J. C. PERRY.
MACHINE FOR MAKING INTERPOSED FABRIC.
APPLICATION FILED AUG. 27, 1904.
8 SHEETS—SHEET 8.
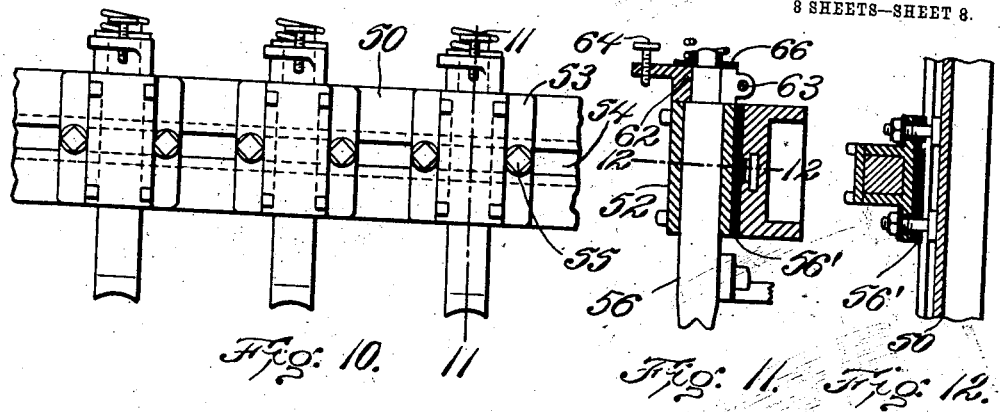
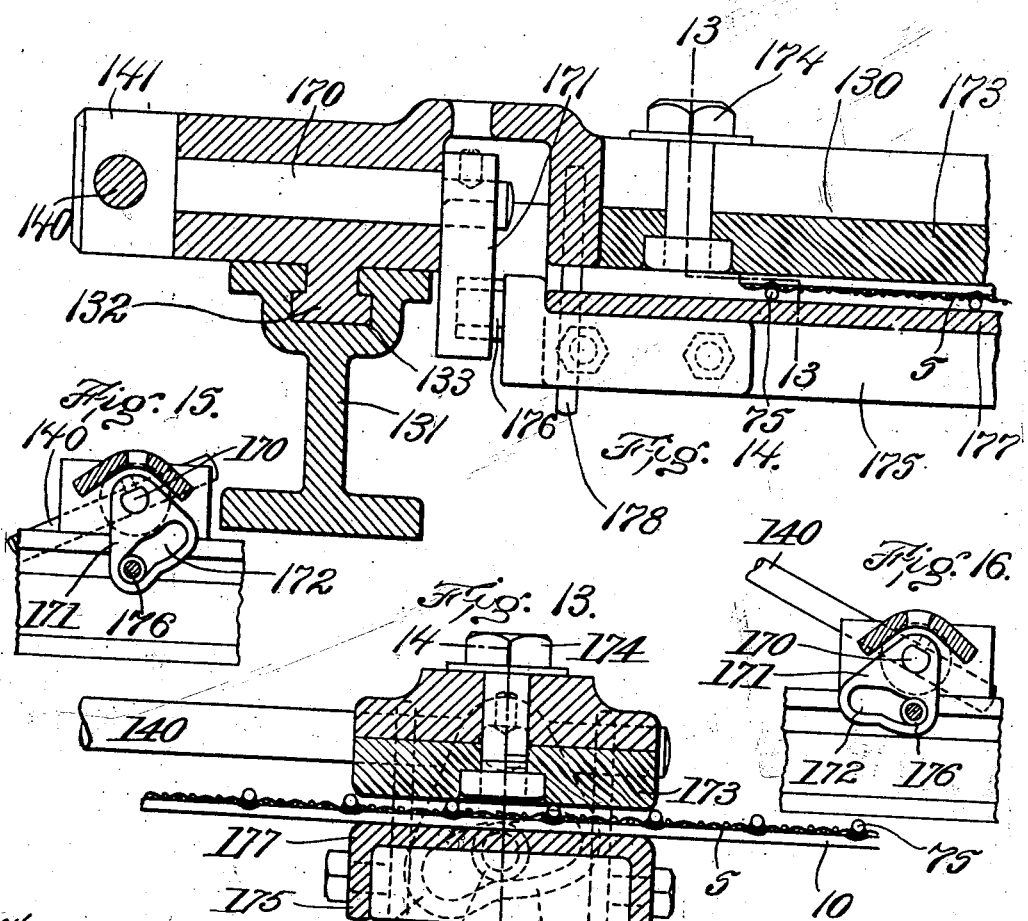

UNITED STATES PATENT OFFICE.

JOHN C. PERRY, OF LA JUNTA, COLORADO, ASSIGNOR TO CLINTON WIRE CLOTH COMPANY, OF BOSTON, MASSACHUSETTS, A CORPORATION OF MASSACHUSETTS.

MACHINE FOR MAKING INTERPOSED FABRIC.

No. 814,393.    Specification of Letters Patent.    Patented March 6, 1906.

Application filed August 27, 1904. Serial No. 222,461.

*To all whom it may concern:*

Be it known that I, JOHN C. PERRY, of La Junta, in the county of Otero and State of Colorado, have invented certain new and useful Improvements in Machines for Making Interposed Fabric, of which the following is a specification.

This invention has for its object the provision of a machine for welding wire fabric. Reference is to be had to the accompanying drawings, forming a part of this specification, the same characters being used to designate the same parts wherever they occur.

Figure 1 in side elevation shows a machine constructed in accordance with my invention. Fig. 2 is a cross-sectional view thereof on the line 2 2 of Fig. 1 looking in the direction of the arrow. Fig. 3 is a horizontal sectional view on the line 3 3 of Fig. 1 looking in the direction of the arrow, showing in plan view the mechanism and arrangement of the parts below the said line 3 3. Fig. 4 is a vertical sectional view on the line 4 4 of Fig. 2 looking in the direction of the arrows, showing the welding-jaws as closed and the feeding mechanism positioned to effect a new feed of the goods after the welding operation is completed. Fig. 5 is a view similar to Fig. 4, showing the welding-jaws open and the feed completed. Fig. 6 is a view similar to Fig. 5, showing in perspective the various elements comprising one of the welding units. Fig. 7 is a detail view of the feed-drive, showing an arrangement by which the feed may be varied. Fig. 8 is a detail perspective view showing the two vertically-movable girths that support and carry the upper welding-jaws. Fig. 9 is a detail view of a part of the two vertically-movable girths, showing the means for supporting the movable sliding jaws. Fig. 10 is a detail view showing in rear elevation the lower of the two movable girths shown in Fig. 8 and means whereby the boxes and movable jaw may be adjusted laterally to position the jaws as desired. Fig. 11 is a vertical sectional view on the line 11 11 of Fig. 10, showing the arrangement of the welding-jaw with its complemental box. Fig. 12 is a cross-sectional view on the line 12 12 of Fig. 11. Fig. 13 is a vertical cross-sectional view on line 13 13 of Fig. 14, showing a modified feed to be used in place of the claws shown in Figs. 4 and 5. Fig. 14 is a section on line 14 14 of Fig. 13, showing the connection between the cam carried by the pintle of the pitman and which serves to open and close the feeding-jaws. Fig. 15 is a detail view of the cam construction between the two jaws of the feed, showing the parts as positioned when the jaws are open. Fig. 16 is a like view showing the parts as positioned when the jaws are closed. Figs. 17, 18, and 19 are detail views showing the arrangement of the transformers for connecting the closely-positioned welds.

1 represents a suitable framework adapted to carry and support the various parts of the machine.

Referring to Figs. 1, 2, and 3, 2 2 represent two upwardly-extending brackets secured to the front uprights of the frame. (See Fig. 1.) These brackets are notched at their upper ends, as at 3, to receive the pintle 4 of a shaft carrying a roll of fabric 5. This fabric may be composed of wire connected together in any desired way, or it may be composed of cloth or asbestos, or it may be composed of a combination of the two or of any desired material, it being the purpose of this machine to electrically weld and stiffen said fabric by arranging metallic rods upon the bottom and top surface and welding said rods together at the point of intersection through said fabric, one form of the finished fabric being shown in my Patent No. 659,416, granted to me October 9, 1900. 6 6 represent two standards secured to the top of the machine at the front end thereof immediately in the rear of the brackets 2. These standards support two rolls 7 7, slightly spaced apart. 8 represents a roll secured in the standards 6 above the roll 7 7 and in a vertical plane between said rolls 7 7. The roll 8 may be adjusted up and down by means of screws 9, carried by said standards. By this arrangement the longitudinal stiffening-wires 10 are straightened as they are fed into the machine. 12 12 represent two standards in the rear of the standards 6, there being one of these standards on each side of the machine. (See Figs. 1 and 3.) 13 represents a roll carried by the standards 12 and arranged in the horizontal plane of the rolls 7 7. 14 represents a roll carried by the standard 12 above the roll 13. This roll 14 can be adjusted toward and from the roll 13 by means of a screw 15, carried by each standard 12. The fabric 5 enters between the rolls 13 and 14 over the longitudinal stiffening-wires 10, as shown. 16 16 represent two standards, one secured on either side of the machine just in front of the standards 12. These standards 16 support a bed-plate 17, over which the fabric 5 passes as it is drawn into the machine, being maintained against said bed-plate by means of a roll 18, carried by the standards 16 and on the front side thereof, the roll 18 being so positioned that its lower surface will maintain the fabric 5 against the bed-plate 17. 19 represents a reciprocating girth whose ends are guided in suitable ways (not shown) in the standards 16. This girth will carry any suitable operated surface or tool, serving either to straighten the fabric 5, crimping said fabric, perforating said fabric, or to do any desired work to said fabric prior to the time that it enters between the rolls 13 and 14 over the longitudinal stiffening-rods 10. The girth 19 is reciprocated by means of two pitmen 20, one on either side of the machine, (see Fig. 2,) each pitman being connected at its lower end to said girth and at its upper end to one arm of a bell-crank 21, each bell-crank 21 being pivoted at its angle to ears 22, carried by a standard 23, there being one of these standards, as shown, on each side of the machine just in the rear of the standards 12. (See Fig. 3.) Each pitman 20 is made adjustable by means of a turnbuckle or an equivalent device 20$^a$, by means of which the throw of the pitman and of the girth 19 may be adjusted. 24 24 represent two standards at the rear of the standards 23 23, there being one of the standards 24 on each side of the machine. (See Fig. 3.) The standards 23 24 on each side of the machine are connected near the upper end by a horizontal girth 25. 26 represents a short driving-shaft carried by a box on top of the left-hand girth 25. (See Figs. 1 and 2.) 27 represents a driving-pulley fast on the shaft 26, adapted to be driven by a belt 28 from any suitable source of power. 29 represents a spur-gear fast on the inner end of the shaft 26 and meshing with a spur-gear 30, fast on the shaft 31, supported at its end in suitable bearings carried by the girth 25. The shaft 31 constitutes the main shaft of the machine, from which the various parts of the machine receive their motion and time. The upper ends of the uprights 23 23 are connected by a girth 23$^a$, while the upper ends of the uprights 24 are connected by a girth 24$^a$.

Referring to Figs. 4 and 5, 32 represents a pitman, there being one at each end of the machine. Each pitman at its rear end is enlarged and formed with a rectangular opening 33, adapted to fit and slide upon a block 34, each block 34 being loosely mounted on the shaft 31. By this arrangement the pitman 32 may have a sliding engagement with its complemental block 34, being supported by the block and also having a pivotal motion by reason of the block being loosely mounted on the shaft 31. Fast upon the shaft 31 and adjacent the right-hand pitman 32 a disk 35 is secured, said disk upon its outer face being formed with a cam-groove or path-cam 35$^a$. A like path-cam 35$^a$ is formed in the outer face of the gear 30, (see Fig. 1,) the latter corresponding in position to the disk 35. Each pitman 32 is formed with a cam-truck 36, arranged in its complemental path-cam 35$^a$. By the described arrangement as the shaft 31 is rotated a reciprocating motion is given to each pitman 32. 37 represents a link pivoted at the free end of each pitman 32 and at its other end to the vertical arm of one of the bell-cranks 21. By this arrangement the two pitmen are reciprocated. Each rocks its respective bell-crank and the pitman 20, thereby reciprocating the beam or the girth 19.

40, Figs. 4, 5, and 8, represents a sliding girth, the ends of which are formed with grooves 41, adapted to engage and slide on vertical ways 23$^b$ on the inner side of the uprights 23. A link 42 is pivoted at its lower end to each end of the girth 40. A complemental link 43 is pivoted at one end to each link 42, the upper end of each link 43 being pivoted to an ear 44, carried by the girths 23$^a$. Each pair of the links 42 43 forms a toggle, the two toggles serving as a means by which the girth 40 is raised or lowered, for purposes hereinafter described. Each pitman 32 is connected by a pintle 45 with one of the links 43, the forward motion of the pitmen 32 thus serving to set the toggles or lower the girth 40 and rock the bell-cranks 21 to lower the girth 19, a reverse motion of these pitmen serving to rock the bell-cranks 21 to raise the girth 19 and break the toggles to raise the girth 40.

Referring to Figs. 4, 5, 6, 8, 9, 10, 11, and 12, 50 represents a sliding girth arranged below the girth 40 and connected thereto by brackets 51 51, one at each end of the girths. (See Fig. 8.) The girth 50 on either end is formed with grooves 50$^a$, arranged to engage the vertical ways 23$^b$. As shown, the girth 50 between the brackets 51 51 or between its ends is deflected toward the front of the machine a sufficient distance to bring the parts carried by the rear of the girth 50, hereinafter described, in the same vertical plane with the parts carried by the under side of the girth 40, hereinafter described. The girths 40 50, together with their brackets 51 51, (see Fig. 8,) I term a "double sliding" girth, since although each girth 40 and 50 carries independent elements said elements are associated, and the brackets 51 cause the two girths, with their associated elements, to travel in unison. 52 represents a series of rectangular-shaped boxes, acting as guides, carried on the rear face of the girth 50. While six of such boxes are shown for illustration, it will be understood that any desired number can be employed. Each box 52 is formed on either side with a flange 53. A longitudinal dovetailed or flanged groove 54 is formed in the rear side of the girth 50. A series of bolts 55, two for each box, have their heads arranged in the groove 54, while the body of the bolts are arranged in complemental holes in the flanges 53. Each box 52 and its bolts 55 are insulated from the girth 50 by insulating material 56'. By this arrangement each box 52 can be slid to any desired position on the girth 50 beneath the girth 40 and clamped in position. In each box 52 is slidingly arranged a rectangular-shaped copper bar 56, notched, as at 57, at its lower end, constituting an upper and movable welding-jaw. 62 represents a split collar of non-conducting material, arranged upon a reduced end of each bar 56 and secured in place by means of clamping-screws 63. A rearwardly-projecting arm on said collar carries a thumb-screw 64. The lower face of the girth 40 is formed with longitudinal dovetailed or flanged groove 58, in which are arranged the heads of a series of bolts 59, shown as six in all, one for each bar 56. A check-nut 60 on each bolt 59 and arranged to engage the lower face of the flanges of the groove 58 serves as a means for holding a particular bolt at a particular point by pinching the flanges of the groove 58 between said nut 60 and the head of the bolt 59. A screw-threaded collar 61 is arranged upon each bolt 59, adjustable up and down on said bolt. A spiral spring 65 is arranged upon each bolt 59. The lower end of each spring 65 engages a collar 66, of insulating material, arranged upon the upper end of each bar 56, as shown in Figs. 5 and 11. By the described arrangement the bars 56 are given a reciprocating motion by means of the reciprocation of the girths 40 and 50, while at the same time each bar 56 has an independent vertical yielding motion due to the action of its complemental spring 65, and the force exerted by the spring 65 can be adjusted by means of the collar 61. 70 represents a stationary girth carried by the framework of the machine below and in the plane of the girths 40 and 50, as shown in Figs. 5 and 6. The girth 70 is formed on its upper face with a rectangular dovetailed groove 71. 72 represents a series of copper bars formed upon their upper faces, with grooves 73 arranged crosswise of the machine and the complemental notches 57. The notches 57 and grooves 73 receive the cross-wires 75. Each bar 72 is further formed with a notch 74, arranged at right angles to the plane of the groove 73 and the notch 57. The notch 74 is designed to receive the longitudinal wires 10. Each bar 72 constitutes a stationary electrode or welding-jaw and is formed on its lower end with a flange 76. 77 77 represent two bolts, one on each side of each bar 72, arranged in holes in the flange 76. The bolts 77 at their lower ends are provided with heads 78, arranged in the dovetailed groove 71. 79 represents a sheet of insulating material arranged between the flange 76 and the face of the girth 70 and also around the bolt. By this arrangement each bar 72 may be slid crosswise of the machine to any desired point to bring it under its complemental bar 56 and then secured in place by tightening the bolts 77. 80 represents a wire running from the primary coil of the transformers 81 to a source of power, there being a transformer for each pair of welding-jaws or electrodes 56 72. 82 represents the wire from a source of power to a suitably-insulated bus-bar 83, carried by the girth 24ª at the top of the machine and insulated therefrom. (See Figs. 4 and 5.)

Referring to Fig. 2, 84 represents a stationary girth at the lower part of the machine, carrying upon its upper side insulating-blocks 85, each transformer 81 being arranged upon an insulating-block 85. 86 represents the secondary coil of each transformer. One arm 87 of said coil is extended vertically, and at its upper end it is connected to a bar 72 in any preferred way. (See Figs. 5 and 6.) By this arrangement one branch of the secondary coil is connected to its complemental stationary electrode or welding-jaw. In this class of machine it is necessary to have the opening between the upper and lower welding-jaws unobstructed. It is necessary to feed into the machine not only the longitudinal and cross wires, but also the interposed fabric 5. In order to connect the movable jaws with the electrodes and yet not obstruct the opening between the upper and lower jaws, I may use either form or any form of bar. I deflect from the point of its connection to its complemental terminal 88 the connections between the electrode or welding-jaw 56 and the terminals 88, and thus avoid obstructing the opening between the upper and lower welding-jaws. 89 represents a copper bar secured on the terminal 88 of the secondary coil of each outside transformer. (See Fig. 2.) The horizontal arm of the bar 89 is so arranged that the vertical arm of the bar 89 is sufficiently to one side of the vertical plane occupied by the interposed fabric 5 that connection may be made between each bar 89 and its complemental electrode 56 without interfering with the space between the welding-jaws. A like copper bar 90 is in like manner connected at its lower end to a terminal 88 of the secondary circuit of its transformer. The bars 90 (see Fig. 2) when not L-shaped are given a sufficient deflection to the right or left in order that their ends may be connected with their complemental electrodes 56 without interfering with the space between the welding-jaws or electrodes. 91 (see Fig. 6) represents a copper bar connected to each welding-jaw or electrode 56 and extending toward the front of the machine. 92 represents a series of copper plates one end of which is connected to the end of each bar 91, the other end being connected to the top of each bar 89 or 90, as the case may be. By this arrangement a flexible connection is made between each terminal 88 and its complemental electrode or welding-jaw 56, while at the same time such connection is so arranged as to leave an unobstructed opening between the welding-jaws.

Referring to Figs. 4, 5, and 6, 94 represents a plate of insulating material mounted upon the top of the framework of the machine just in the rear of the girth 23ª and in front of the girth 24ª. 95 represents a series of flexible arms carried by the plate 94, there being one of these arms for each pair of welding jaws or electrodes 56 72. Preferably these arms are made of non-conducting material, and each at its free end carries a plug 96, of conducting material, arranged beneath the buss-bar 83. 97 represents a series of cams arranged on the shaft 31, there being a cam for each arm 95, said cams 97 being positioned on the shaft 31 in staggered fashion and each one being designed to engage its arm 95 to make contact between a complemental plug 96 and buss-bar 83 at the particular time when it is desired to apply the welding-current, such engagement of the cam and arm continuing until after it is desired to have the welding-current cut out. The duration or action of each cam 97 is designed to cover a period slightly longer than the actual welding operation, the latter being automatically terminated by mechanism hereinafter described, one purpose of the cams 97 being to have the circuit closed between the buss-bar 83 and plug 96, both for the automatic closing and breaking of the circuit by mechanism controlled by the welding-jaws. 98 represents a girth secured at the rear side of the standards 23, substantially in rear of the girth 50 in the raised position of the latter. 99 represents a dovetailed groove formed in the upper face of the girth 98. 100 represents a series of brackets each formed with a flange 101. 102 represents a bolt carried by each flange 101 and formed with a head 103, arranged in the groove 99. By this arrangement each bracket 100 may be slid crosswise of the machine and adjusted with relation to its complemental bar 56, there being a bracket 100 for each bar 56. The desired adjustment being secured, each bracket can be rigidly locked in place by tightening the bolts 102. Preferably each bracket 100 is suitably insulated from the girth 98 by insulating material 104. 106 represents a bracket of conducting material suitably secured to the top of each bracket 100 and insulated therefrom by insulating material 107. A horizontal sliding pin 108, of conducting material, is arranged to slide in suitable openings in the two vertical arms of the bracket 106. A leaf-spring 109 and coil-spring 110 are arranged upon the pin 108 between the shoulder on said pin near its front end and between the two vertical arms of the bracket 106 in such way as to yieldingly hold the front end of the pin forward. 111 represents a wire connecting each plug 96 with its complemental bracket 106 and contact-pin 108. On each bracket 100 and below each bracket 106 is pivoted a bell-crank lever 112. 113 represents a contact-plug carried by the end of the vertical arm of each bell-crank lever 112 and suitably insulated therefrom. If desired, the bell-crank lever 112 may be insulated from the bracket 100. 114 represents a wire running from each plug 113 to its complemental transformer 81, the primary circuit from the source of power to each transformer being represented in detail in Figs. 4, 5, and 6 and shown in Fig. 1 complete, the current passing in Fig. 1 by wire 82 to the buss-bar 83, thence to the contact-plug 96, wire 111, bracket 106, contact-pin 108, contact-plug 113, wire 114 to the primary coil of each transformer 81, thence to wire 80 to the source of power. The horizontal arm of each bell-crank lever 112 is arranged over and adapted to be engaged by the flange 115 of each collar 62, engagement being made by a portion of said flange to one side of the plane of the contact-screw 64, carried by such flange. 116 represents a bell-crank lever carried by each bracket 100 at its lower front side. (See Figs. 4, 5, and 6.) The horizontal arm of each bell-crank lever 116 is arranged below and adapted to be engaged by its complemental contact-screw 64. 118 represents a plug carried on the rear side of each vertical arm of each bell-crank lever 116. 119 represents a complemental plug carried by each horizontal arm of each bell-crank lever 112. 120 represents a tension-spring, one end of which is connected to the upper end of the vertical arm of the bell-crank lever 116, while the rear end of the spring is connected to the vertical arm of the bell-crank lever 112; the spring 120 tending to break contact with the plug 113 and pin 108, except when the parts are in the position shown in Figs. 5 and 6, where the rearward movement of the vertical arm of the bell-crank lever 116 is prevented by the plug 119, while the downward movement of the horizontal arm of the bell-crank lever 112 is prevented by the plug 118, the plug 118, as shown, being on the vertical rear face of the vertical arm of the bell-crank lever 116, while the plug 119 is on one side of the horizontal arm in each bell-crank lever 112 in such wise that the plug 118 prevents the downward movement of the plug 119, while the latter prevents the rearward movement of the vertical arm of the bell-crank lever 116 until that arrangement of parts is disturbed, as hereinafter described.

Referring to Figs. 1, 3, 4, 5, 13, 14, 15, and 16, 130 represents a horizontal sliding girth the ends of which rest upon the top of guides 131 on each side of the machine. In order to maintain the girth in place, a dovetailed head 132 is formed in each end of the girth 130 and is arranged in a complemental slot 133 on the top of each guide 131. (See Fig. 14.) By this arrangement the girth is securely maintained in the path of its desired motion. 134 represents a shaft carried in suitable bearings near the bottom of the standards 24. 135 represents a sprocket-wheel fast upon one end of said shaft. 136 represents a complemental sprocket-wheel carried by the shaft 31. 137 represents a sprocket-chain connecting the wheel 136 with the wheel 135. These sprocket-wheels may be circular, as shown in Fig. 1, or one or both may be elliptical, as shown in Fig. 7. Any desired arrangement of gears may be employed to effect either a continuous or variable motion of the feed-girth 130, as hereinafter described, depending upon the kind of work to be done and kind of feed desired. Each wheel 135 is formed with a radial slot 139, in which is arranged an adjustable wrist-pin 138, adapted to be adjusted in the slot 139 and locked in any desired position to obtain a greater or smaller throw. 140 represents a pitman connected at one end to this complemental wrist-pin 138 and at its other end connected to a loose collar 141 on the end of the girth 130. In Fig. 3 the front end of each pitman 140 is shown as screw-threaded to engage complemental screw-threads in its collar 141. In this construction the rear end of each pitman 140 will preferably be formed with a head arranged in a suitable recess carried by the wrist-pin, so that by rotating the rod or pitman 140 and loosening the nut of the said pin the wrist-pin can be adjusted in its slot, as desired. By the construction described the girth 130 is reciprocated back and forth the required distance and at required times. This girth is shown as formed with a slot 142. In this slot are arranged a series of bolts 143. These are shown corresponding to the number of bars 56 or longitudinal wires 10. This number, however, can be varied, if desired. The bolts 143 can be adjusted in the slot 142 to any desired point and then locked in place. To the lower end of each bolt 143 in the form shown in Figs. 1, 3, 4, and 5 is secured an arm or block 144, projecting toward the front of the machine. 145 represents a series of hooks, one for each block 144. Each hook 145 is formed at its free end to straddle a longitudinal wire 10 and is also formed with a shoulder 147 to positively engage the cross-wire 75 in the feeding motion of the hooks, the front end of the hook being formed with an incline 148, so that the hook will ride over the cross-wires 75 when moving forward to engage the fabric 5 to effect a new feed. The feeding action is thus automatic and timed with the rest of the machine. 150 represents a cylindrically-shaped girth carried by the uprights 23 just in the rear of the girth 70, and the series of electrodes 72, the upper side of the girth 150 being in the plane of the upper face of the bars 72. This girth sustains the fabric 5 during the feeding operation of the hooks 145 and also serves to maintain the hooks at a proper elevation and to insure the upward and releasing motion of the end of the hook 145 in the movement of the hooks toward the front of the machine to a position to effect a new feed. 151 represents a series of bell-crank levers, there being one for each bar 72, the said levers being pivoted at the side of said bars. To the horizontal arm of each lever is connected a coiled spring 152, the lower end of the spring being connected to the flange 76. The upper end of the vertical arm of each bell-crank lever 151 stands normally in the position shown in Fig. 4 and prevents the cross-wires 75 as they are laid or fed into the grooves 73 from being pushed beyond the plane of the bars, the vertical arms of the bell-crank levers 151 serving as a guide to insure the cross-wires 75 entering the grooves 73. At the same time during the feed of the material these bell-cranks 151 are depressed by the cross-wires 75, and thus do not interfere with the feed.

Referring to Figs. 13, 14, 15, 16, wherein I have shown a gripping form of feed, each of the collars 141 is formed with a pintle 170, that extends inwardly through the end of the girth 130, that rests on the guide 131. To the inner end of these pintles 170 is secured a part of a disk 171, formed near its periphery with a cam-slot 172. 173 represents a facing of any suitable material, to constitute a feeding-jaw secured to the lower side of the girth 130 by bolts 174, between the ends of the pintles 170. 175 represents a girth complemental to the girth 130, arranged immediately beneath the same. This girth 175 at each end is formed with a pin 176, arranged in its complemental cam-path 172. 177 represents a plate of suitable material for engaging the work secured to the top of the girth 175, the work being grasped between the plates 173 and 177, as will be evident from an inspection of the drawings. As the girth 130 is moved forward by the pitman 140 the latter takes the position shown in Fig. 15, in which the pintles 176 are at a point in the slot 172 farthest away from the pintles 170. This lowers the plate 177 so that it is out of contact with the work. When, however, the girth 130 reaches the limit of its forward movement and begins its rearward movement, the pitman 140 passes to the position shown in Fig. 16, raises the girth 175 to grip the work between the plate 177 and plate 173, the work being pulled by these jaws during the rearward movement of the latter. 178 represents a series of guide-pins carried by the girth 130 and extending through the ends of the girth 175.

Figs. 17, 18, and 19 show successive positions of the electrodes in order to secure closely-positioned welds, and such arrangement can be made in one machine, or after the welds are positioned, as shown in Fig. 17, the material can be passed to another machine to effect the welds, as shown in Fig. 18, and thereafter to another machine to position the welds, as shown in Fig. 19. In either event the position of the welding-jaws 56 72 can be made as desired by means of their sliding engagement with their complemental girths.

The operation of my machine is as follows: The longitudinal wires 10 are fed into the machine between the rolls 7, 8, 13, and 14 and thereafter over the series of supporting-rolls 180. The interposed fabric 5 is fed into the machine between the rolls 13 and 14 and over the wires 10. The cross-wires are fed into the machine in any desired way, either as a continuous strip to be severed or as independent bars laid upon the interposed fabric 5, the latter being between the bars 75 and 10 (See Fig. 13.) As the fabric 5 passes under the girth 19 it is straightened or crimped or subjected to any desired operation. The cross-wires 10 having been placed upon the electrodes 72, the electrodes 56 descend, gripping the cross-wires 75 and longitudinal wires 10, as shown in Fig. 4, under the yielding pressure of the spring 65. As the metal softens, due to the action of the welding-current, the spring 65 forces the jaws 56 downward, bringing the contact-screw 64 into engagement with the horizontal arm of the bell-crank lever 116. This releases the plug 118 from engagement with the plug 119 and permits the spring 120 to pull the plug 113 out of contact with the pin 108, thus breaking the welding-current. By means of the adjusting-screw 64 the amount of upset of each welding-jaw can be regulated as desired. It will be noticed that by the descent of the girths 40 and 50 each pair of jaws 56 and 72 is made to grip the wires 10 and 75 between them; yet the welding action takes place simultaneously, the parts being so timed that after the jaws have been caused to grip the wires the first cam 97 engages its complemental arm 95, thus closing the welding-circuit to the first pair of jaws, or, if desired, the circuit through all of the jaws can be closed simultaneously, depending upon the arrangement of the cams 97, the latter in either case being arranged to close the welding-circuit after the jaws have gripped the wires, while the descent of the jaws 56 to soften the metal causes the automatic breaking of the welding-current, the jaws of the girths 40 and 50 after the welding action causing the flange 115 to engage and raise the horizontal arm of the bell-crank lever 112, and thus restore contact upon the pins 115 and 108, ready for the next welding operation. At the conclusion of each welding and as the girths 40 and 50 are raised the girth 130 makes its rearward stroke to effect a new feed. If desired, the plates 173 177 may be shaped to crimp or otherwise fashion the completed article after it has left the welding-jaws. It will be seen from the foregoing that the operation of the machine is automatic, all of the movements of the machine being timed from the same shaft. I have not shown any special means for feeding in the wires 10 and 75, as I may use any preferred means for this purpose.

Having thus explained the nature of my invention and described a way of making and using the same, although without attempting to set forth all the forms in which it may be made or all of the modes of its use, what I claim, and desire to secure by Letters Patent, is—

1. In combination with the coöperative elements of a fabric-machine, means for feeding strand members and means for welding said members to cross members at points of contact, comprising a plurality of pairs of welding-jaws, means for closing and opening said jaws, a transformer, a bar of conducting material connecting one jaw of each pair to its complemental transformer, said bar being deflected between its ends to provide an unobstructed passage between said jaws.

2. In combination with the coöperative elements of a fabric-machine, means for feeding strand members and means for welding said members to cross members at points of contact, comprising a double sliding girth, a series of rods carried by the rear member of said girth and adjustable thereon, a series of boxes carried by the forward member of said girth and adjustable thereon, a complemental series of plungers carried by said boxes, a spring connecting each rod with its complemental plunger, and means for adjusting the tension of said springs.

3. In combination with the coöperative elements of a fabric-machine, means for feeding strand members and means for welding said members to cross members at points of contact, comprising a double sliding girth, a series of rods carried by the rear member of said girth and adjustable thereon, a series of boxes carried by the forward member of said girth and adjustable thereon, a complemental series of plungers carried by said boxes, a spring connecting each rod with its complemental plunger, and means for adjusting the tension of said springs, a stationary girth, a series of stationary plunger members carried thereby and adjustable thereon and arranged to coact with their complemental movable plungers.

4. In combination with the coöperative elements of an interposed-fabric machine, means for feeding strand-wires, means for feeding an interposed fabric, means for bonding stay-wires to the strand-wires through the interposed fabric at predetermined points, and means for feeding the completed fabric, comprising two bars or gripping-plates arranged with the finished product between them, a pitman connected to each end of one of said bars whereby the latter may be reciprocated in the direction of the feed of the fabric, and means for moving one bar toward and away from the other at predetermined times, comprising a cam carried by the said pitman and connections between said cam and the relatively movable bar.

5. In combination with the coöperative elements of a wire-fabric machine, means for feeding strand-wires, means for feeding an interposed fabric, means for bonding the stay-wires to the strand-wires through the interposed fabric at points of intersection, comprising a gang of pairs of complemental welding-jaws, electric connections between each of said pairs comprising copper bars, said connections between their ends being deflected beyond the plane of said gang.

6. In combination with the coöperative elements of an interposed-fabric machine, means for feeding the product, comprising a reciprocating girth and a plurality of hooks carried by said girth, said hooks being arranged to engage the bonded stay-wire on each side of the strand-wire, and means for varying the amount of reciprocation of the girth.

7. In combination with the coöperative elements of an interposed-fabric machine, means for feeding the product comprising a reciprocating girth and a plurality of hooks carried by said girth, said hooks being arranged to engage the bonded stay-wire on each side of the strand-wire, and means for giving to said girth an intermittently-variable speed.

8. In a machine for bonding cross and stay wires through an interposed fabric, means for feeding strand-wires, means for feeding an interposed fabric, means for bonding stay-wires to the strand-wires through the interposed fabric at points of intersection, and one or more yielding members carried by the bonding members arranged to position the stay-wires for bonding and to yield to the feeding motion of the stay-wires after bonding.

9. In a machine for bonding cross and stay wires through an interposed fabric, means for feeding strand-wires, means for feeding an interposed fabric, means for bonding stay-wires to the strand-wires through the interposed fabric at points of intersection, and a yieldingly-mounted bell-crank or lever arranged to position the stay-wire for bonding but to yield to the feeding motion of the stay-wire after bonding.

10. In a machine for bonding cross and stay wires through an interposed fabric, means for simultaneously feeding strand-wires and an interposed fabric, means for bonding stay-wires to the strand-wires through the interposed fabric at points of intersection, and means for shaping or forming the interposed fabric, comprising a stationary girth or former and a reciprocating complemental girth or former.

11. In combination with the coöperative elements of an interposed-fabric machine, means for feeding strand-wires, means for feeding an interposed fabric, means for bonding stay-wires to the strand-wires through the interposed fabric at points of intersection, and means for feeding the completed fabric.

In testimony whereof I have affixed my signature in presence of two witnesses.

JOHN C. PERRY

Witnesses:
M. BARNGROVER,
GEO. A. KILGORE.